United States Patent [19]
Manor

[11] 3,865,071
[45] Feb. 11, 1975

[54] AIRCRAFT TAKE OFF INDICATOR SYSTEMS

[75] Inventor: Jehuda Manor, Ramat Hasharon, Israel

[73] Assignee: Israel Aircraft Industries, Ltd., Lod Airport, Israel

[22] Filed: Aug. 23, 1973

[21] Appl. No.: 390,710

[30] Foreign Application Priority Data
Aug. 25, 1972 Israel...................................... 40203

[52] U.S. Cl.............. 116/129 R, 35/10.2, 73/178 T, 116/DIG. 43, 235/150.22
[51] Int. Cl............................ G09f 9/00, G06f 15/50
[58] Field of Search................ 235/150.22; 244/63; 73/178 T; 340/27; 35/10.2; 116/DIG. 43, 129, 35

[56] References Cited
UNITED STATES PATENTS

| | | | |
|---|---|---|---|
| 3,048,329 | 8/1962 | Berggren........................ | 235/150.22 |
| 3,111,577 | 11/1963 | DeGraffenried et al....... | 235/150.22 |
| 3,117,312 | 1/1964 | Watson......................... | 116/DIG. 43 |
| 3,128,445 | 4/1964 | Hosford......................... | 235/150.22 |
| 3,182,498 | 5/1965 | Koletsky et al. ................. | 73/178 T |
| 3,381,656 | 5/1968 | Ohnikian et al. ............... | 116/129 R |

OTHER PUBLICATIONS
Klass, "Monitor Designed to Aid Jet Take-Offs", Aviation Week Magazine, June 23, 1958, pp. 65, 67, 69, 70, 71.
Publication, "Take-off Monitors Compete for Marker", Aviation Week Magazine, July 28, 1958, pp. 77–79.
Snodgrass, "Take-off Aids to Pilots", Skyways Magazine, October, 1957, pp. 24. 89–91.

*Primary Examiner*—Eugene G. Botz
*Assistant Examiner*—Errol A. Krass
*Attorney, Agent, or Firm*—Benjamin J. Barish

[57] ABSTRACT

The present invention relates to aircraft take-off indicator systems, for displaying air speed and distance covered during take-off run, and the point-of-no-return for take-off abort. The aircraft indicator system comprises a first measuring device measuring aircraft air speed and having a first scale displaying said measurement, and a second measuring device measuring distance covered during take-off run and having a second scale displaying said measurement. The second scale is parallel to and laterally of the first scale; and a pre-settable marker is disposed to bridge both of said scales and pre-settable so as to be aligned with a predetermined point on each, thereby providing a continuous indication of whether the minimum airspeed for a safe take-off will be reached before the point-of-no-return.

5 Claims, 3 Drawing Figures

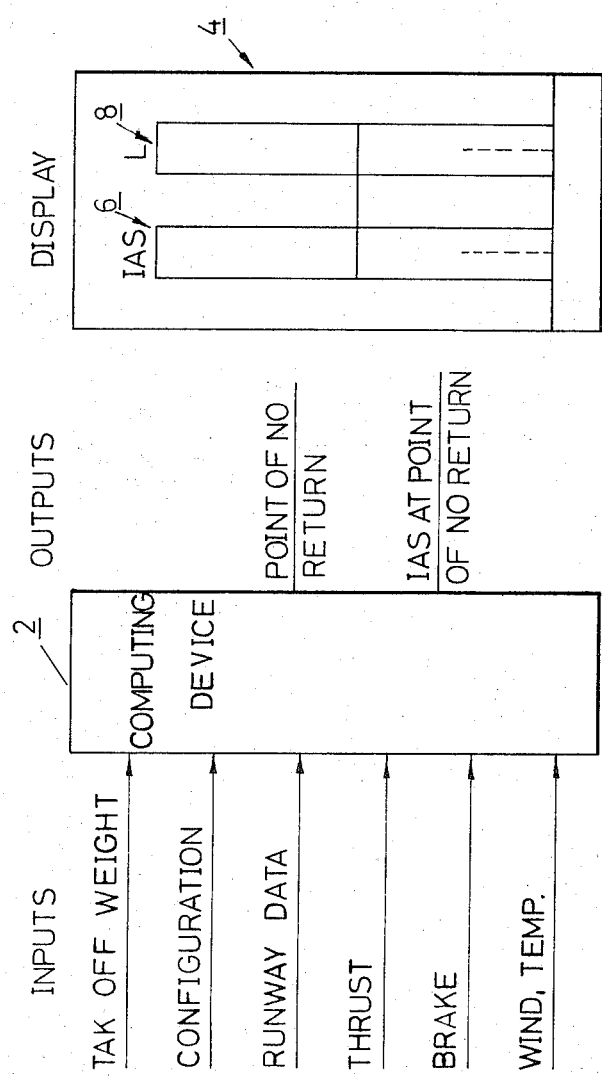
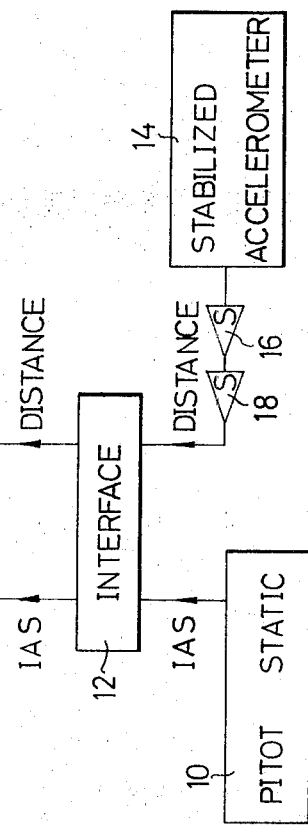
Fig. 1
Fig. 2

3,865,071

AIRCRAFT TAKE OFF INDICATOR SYSTEMS

BACKGROUND OF THE PRESENT INVENTION

The decision, if, when and where to abort a take-off under marginal conditions is a difficult problem in both civil and military aviation. The main difficulty is to determine during the take-off run, the point-of-no-return and minimum speed necessary at that point for a safe take-off. Various methods have been used in the past. Some of these use aircraft acceleration computed during the run, one crew member measuring time and the other reading out air speed. Other methods mark-off segments on the runway by which the distance covered can be identified and compared with the speed. These methods, however, are not entirely satisfactory either because they demand too much activity by the crew during a highwork load stage, such as take-off, or because of insufficient accuracy.

SUMMARY OF THE PRESENT INVENTION

The present invention provides an aircraft indicator system which displays to the pilot all data needed for a correct decision to abort take-off if necessary, while the runway ahead still allows a smooth and a safe stop of the aircraft. In addition, where take-off is preceeding normally and safely, this is clearly indicated by the system, thus minimising the possibility of misleading the crew into an incorrect decision to abort the take-off.

More particularly, the system of the present invention not only provides a solution to the problem of point-of-no-return on take-off, but also provides, during the whole take-off run, a display which presents continuously the development of air speed vs. distance covered. This display enables the crew to anticipate any need for aborting take-off, and thus allows them:

a. to save "decision time" at the point-of-no-return and thus to execute a safe abort;

b. to abort take-off at an earlier stage, before point-of-no-return is reached, thus using smaller braking power and avoiding inconvenient decceleration effects on the passengers;

c. to monitor the display during take-off by one crew member only, thus unburdening the rest of the crew.

According to the present invention, there is provided an aircraft indicator system comprising a first measuring device measuring aircraft air speed and having a first scale displaying that measurement, and a second measuring device measuring distance covered during take-off run and having a second scale displaying that measurement. The second scale is parallel to and laterally of the first scale. A presettable marker is disposed to bridge both scales and is presettable so as to be aligned with a predetermined point on the second scale corresponding to the point-of-no-return (previously computed) of the aircraft upon take-off, and a predetermined point on the first scale corresponding to the indicated air speed (also previously computed) at that point to assure a safe take-off. Thus, the visual observation of the measurements displayed by the two scales during take-off, with reference to the presettable marker, provides a continuous indication of whether the minimum air speed for a safe take-off will be reached before the point-of-no-return.

According to a further feature, one of the scales is displaceable with respect to the other, such that a given value of air speed on the first scale can be placed opposite a given distance on the second scale. In the described embodiment, the displaceable scale is that of the aircraft air speed.

According to a preferred feature of the invention, the first and second scales are both vertical scales disposed in side-by-side relationship.

Further features and advantages of the invention will be described below.

BRIEF DESCRIPTION OF THE DRAWINGS

The invention is herein described, somewhat diagramatically and by way of example only, with reference to the accompanying drawings, wherein:

FIG. 1 illustrates an aircraft indicator system constructed in accordance with the invention;

FIG. 2 illustrates a computing device used in computing, before take-off, the point-of-no-return and the minimum speed necessary at that point for a safe take-off.

DESCRIPTION OF THE PREFERRED EMBODIMENT

Figure 3:
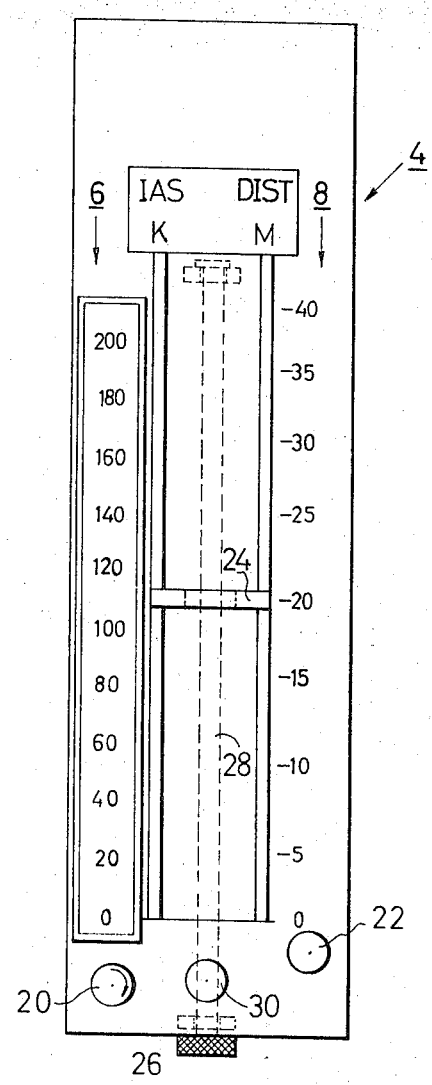
FIG. 3 illustrates the display of the indicator system of FIG. 1.

The indicator system of the present invention permits the crew a continuous monitoring of air speed vs. distance covered during the take-off run, an identification of the point-of-no-return, and an early decision in case of aborted take-off based on displayed air speed and distance covered. If the velocity at the point-of-no-return is lower than the one determined as necessary for a safe take-off, this is made readily apparent to the pilot, permitting him to abort the take-off and bring the aircraft to a safe stop. Equally apparent to the pilot is the fact, if such be the case, that the aircraft speed is equal to or higher than that required for a safe take-off, thereby relieving the pilot of this apprehension during take-off.

The point-of-no-return and its corresponding air speed are first computed on the ground prior to take-off. This is conventional in the present take-off systems, and there are known computing devices, such as slide rules, rotary discs, and electronic computers, for accomplishing this. FIG. 2 diagrammatically illustrates such a computing device, wherein it will be seen that the point-of-no-return, and the indicated air speed at the point-of-no-return, are computed as functions of the following parameters:

1. Take-off weight;
2. Aircraft configuration and type;
3. Runway data, including length, surface condition, slope and altitude;
4. Aircraft thrust;
5. Aircraft braking power;
6. Wind direction, velocity and temperature.

Thus, prior to take-off and while the aircraft is on the ground, a computer 2 is used for computing the point-of-no-return and the indicated aircraft speed at that point. These two values are then used for pre-setting the aircraft indicator system illustrated in FIGS. 1 and 3. During the actual take-off, the indicator system of FIGS. 1 and 3 provides the necessary data concerning aircraft speed and distance covered by the aircraft to permit the pilot to make the earliest possible decision whether it is necessary to abort the take-off or whether the take-off is proceeding safely.

The indicator system of FIG. 1 includes a display panel, generally designated 4, having a vertical scale 6 displaying indicated aircraft air speed, and a second vertical scale 8 displaying distance covered during take-off run, the two scales being in side-by-side relationship.

The air speed scale 6 displays the measurement of an air speed measuring device, block 10, such as an aircraft pilot-static system commonly used in aircraft. The aircraft speed measurement is fed through an interface 12 to the display system 4 and is displayed on vertical scale 6.

Vertical scale 8 displays the distance covered by the aircraft during the take-off run as measured by any suitable measuring device. As an example, a stabilised accelerometer 14 is used, the output being fed to a first integrator 16 which integrates acceleration to compute velocity, and then to a second integrator 18 which integrates velocity to compute distance. The output of the second integrator is fed through interface 12 to the display system 4 and is displayed on vertical scale 8.

Display system 4 is shown more particularly in FIG. 3 wherein it will be seen that the two vertical scales 6 and 8 are in parallel, side-by-side relationship. The indicated air speed scale 6 is shown as the left scale and is provided with graduations from zero to 200 kph. The distance scale 8 is parallel and to the right of scale 6 and is provided with graduation markings of zero to 4,000 meters. The air speed scale 6 is vertically displaceable by rotating knob 20, to permit a given value of air speed on scale 6 to be placed horizontally opposite a given distance (the point-of-no-return) on the distance scale 8. The distance scale may be provided with a resetting knob 22 to permit it to be set to zero.

Display panel 4 further includes a marker 24 disposed to bridge both of the scales and pre-settable so as to be aligned with a predetermined point on each. In the described embodiment, marker 24 is in the form of a bridging bar pre-settable by a rotary knob 26, the two being threadably engaged so that rotation of knob 26 in one direction raises bar 24, and lowers it when rotated in the opposite direction.

Lastly, the display panel 4 includes a starting switch 30 for energizing the system.

The system operates as follows;

first, while the aircraft is still on the ground and before take-off, the point-of-no-return and the indicated aircraft speed at that point are both computed by the use of the computing device schematically shown at 2. These values are computed by conventional techniques using the several parameters briefly described above, all of which are known at this time before take-off. In the example illustrated in FIG. 3, the point-of-no-return, as computed by computing device 2, is 2,000 meters and the indicated air speed, as also computed by computing device 2, is 105 kph.

When the point-of-no-return and the aircraft speed at that point are computed, knob 20 on the display panel 4 is rotated to bring the computed air speed opposite to the computed point-of-no-return. Marker bar 24 is then pre-set, by rotating knob 26, so as to be aligned with and to bridge these two computed points.

During take-off, the aircraft speed is continuously measured by measuring device 10 and is displayed on scale 6; and the distance covered by the aircraft is continuously measured by measuring device 14, including its integrators 16 and 18, and is continuously displayed on scale 8. The pilot thus can readily observe the rate of increase of the air speed on scale 6 in relation to the rate of increase of the distance covered on scale 8, both in relation to the marker bar 24. If he sees that the rate rise of the indicator on distance scale 8 is such that it will intercept the marker bar 24 before the latter is intercepted by the rate of rise of the indicator on the aircraft speed scale 6, the pilot knows he will have to abort the take-off, and he can therefore safely do so even before reaching the point-of-no-return. On the other hand, if he seen that the rate of rise on the air speed scale 6 is faster than that on the distance scale 8, so that the air speed indicator will intercept marker bar 24 well before it would be intercepted by the distance indicator, the pilot knows that it will not be necessary to abort the take-off and therefore is actually relieved of this apprehension even before reaching the point-of-no-return.

Thus, the indicator system not only presents the pilot with the necessary information for making the determination at the actual point-of-no-return, as to whether or not to abort the take-off, but also presents this information to enable him to make this determination well in advance of the actual point-of-no-return.

The vertical scales 6 and 8 may be of any known types commonly used in aircraft moving tape indicators. Preferably, they are of different colours; for example, red may be used for the distance covered scale 8 and the bridging marker 24, and green may be used for the air speed scale 6. The distance covered scale 8 is reset to zero at the start of the take-off run by means of knob 22 and may be provided with means for automatically re-setting it to zero at the end of the 4,000 meter run. Instead of using a stabilized accelerometer 14 including its two integratoral 16 and 18 for measuring distance, if the aircraft is equipped with an inertia navigation system, the inertial platform of such a system may be used for supplying the distance measurement displayed on scale 8. Further, the aircraft air speed measurement displayed on scale 6 may be supplied from an air data computer, rather than the pilot-static system indicated by block 10 in FIG. 1. In general, any means for measuring the aircraft's indicated air speed and the distance covered during take-off may be used.

The invention also has application in automatic take-off and landing systems and/or in pilotless aircraft or drone systems where the data will be displayed to the controllers outside the craft.

Many other variations, modifications and applications of the illustrated embodiment will be apparent.

What is claimed is:

1. An aircraft indicator system, comprising: a first measuring device measuring aircraft air speed and having a first scale displaying said measurement, a second measuring device measuring distance covered during take-off run and having a second scale displaying said measurement; said second scale being parallel to and laterally of said first scale; and a pre-settable marker disposed to bridge both of said scales and presettable so as to be aligned with a predetermined point on the second scale corresponding to the point-of-no-return of the aircraft upon take-off, and with a predetermined point on the first scale corresponding to the indicated air speed at that point to assure a safe take-off, whereby visual observation during take-off of the measurements displayed by the two scales with reference to said pre-settable marker provides a continuous indication of whether the minimum air speed for a safe take-off will be reached before the point-of-no-return.

2. A system of claim 1, wherein one of said scales is displaceable with respect to the other, such that a given value of air speed on said first scale can be placed opposite a given distance on said second scale.

3. A system according to claim 1 wherein said first and second scales are both vertical scales disposed in side-by-side relationship.

4. A system of claim 2, wherein said displaceable scale is that of said aircraft air speed.

5. A system of claim 1, wherein said marker is a bridging bar pre-settable by a rotary knob.

* * * * *